US011654924B2

(12) United States Patent
Simoncini et al.

(10) Patent No.: US 11,654,924 B2
(45) **Date of Patent: *May 23, 2023**

(54) SYSTEMS AND METHODS FOR DETECTING AND CLASSIFYING AN UNSAFE MANEUVER OF A VEHICLE

(71) Applicant: Verizon Connect Development Limited, Dublin (IE)

(72) Inventors: Matteo Simoncini, Florence (IT); Douglas Coimbra De Andrade, Florence (IT); Samuele Salti, Florence (IT); Leonardo Taccari, Florence (IT); Fabio Schoen, Florence (IT); Francesco Sambo, Florence (IT); Leonardo Sarti, Florence (IT)

(73) Assignee: Verizon Connect Development Limited, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 17/820,633

(22) Filed: Aug. 18, 2022

(65) Prior Publication Data

US 2022/0402505 A1 Dec. 22, 2022

Related U.S. Application Data

(63) Continuation of application No. 16/947,918, filed on Aug. 24, 2020, now Pat. No. 11,440,555.

(30) Foreign Application Priority Data

May 18, 2020 (IT) ........................ 102020000011368

(51) Int. Cl.

*B60W 40/09* (2012.01)
*G06F 21/35* (2013.01)

(Continued)

(52) U.S. Cl.

CPC ............ *B60W 40/09* (2013.01); *G06F 21/35* (2013.01); *G06V 20/588* (2022.01); *G07C 5/008* (2013.01);

(Continued)

(58) Field of Classification Search

CPC ... B60W 40/09; B60W 2540/30; G06F 21/35; G06V 20/588; G07C 5/008; G07C 5/0891; G08G 1/20

See application file for complete search history.

(56) References Cited

U.S. PATENT DOCUMENTS

| | | | | |
|---|---|---|---|---|
| 9,594,725 B1 * | 3/2017 | Cook | .................... | G06F 3/0482 |
| 11,440,555 B2 * | 9/2022 | Simoncini | ............ | B60W 40/09 |

(Continued)

OTHER PUBLICATIONS

Taccari, et al., "Classification of crash and near-crash events from dashcam videos and telematics", 2018 21st International Conference on Intelligent Transportation Systems (ITSC) Maui, Hawaii, USA, Nov. 4-7, 2018, p.p. 2460-2465. 978-1-7281-0323-5/18/$31.00 ©2018 IEEE.

*Primary Examiner* — Thomas S McCormack

(57) ABSTRACT

A maneuver classification platform may obtain video data and telematic data that are associated with a driving event involving a vehicle. The maneuver classification platform may analyze the video data to identify a path of the vehicle along a roadway during the driving event, and based on markings of a plurality of roadways. The maneuver classification platform may analyze the video data to determine a type of a vehicle maneuver performed by the vehicle during the driving event. The maneuver classification platform may determine a maneuver score of the driving event based on the type of the vehicle maneuver, the path of the vehicle, and the telematic data. The maneuver classification platform may send a message associated with the maneuver score and (Continued)

a vehicle identifier of the vehicle to a client device to permit the client device to use the maneuver score.

20 Claims, 9 Drawing Sheets

(51) Int. Cl.

| | |
|---|---|
| ***G07C 5/00*** | (2006.01) |
| ***G07C 5/08*** | (2006.01) |
| ***G08G 1/00*** | (2006.01) |
| ***G06V 20/56*** | (2022.01) |

(52) U.S. Cl.
CPC ............. *G07C 5/0891* (2013.01); *G08G 1/20* (2013.01); *B60W 2540/30* (2013.01)

(56) References Cited

U.S. PATENT DOCUMENTS

2007/0143002 A1* 6/2007 Crowell ................ G07C 5/004 701/123
2015/0158495 A1* 6/2015 Duncan ................. G08G 1/163 701/1
2017/0108859 A1 4/2017 Xu et al.
2017/0200061 A1 7/2017 Julian et al.
2018/0075309 A1* 3/2018 Sathyanarayana ..... G06V 40/20
2018/0075380 A1 3/2018 Perl et al.
2020/0057894 A1* 2/2020 Sambo ...................... G06T 7/20
2020/0057896 A1* 2/2020 Pohl .................... G05D 1/0214
2020/0269843 A1* 8/2020 Wissing .......... B60W 30/18163

* cited by examiner

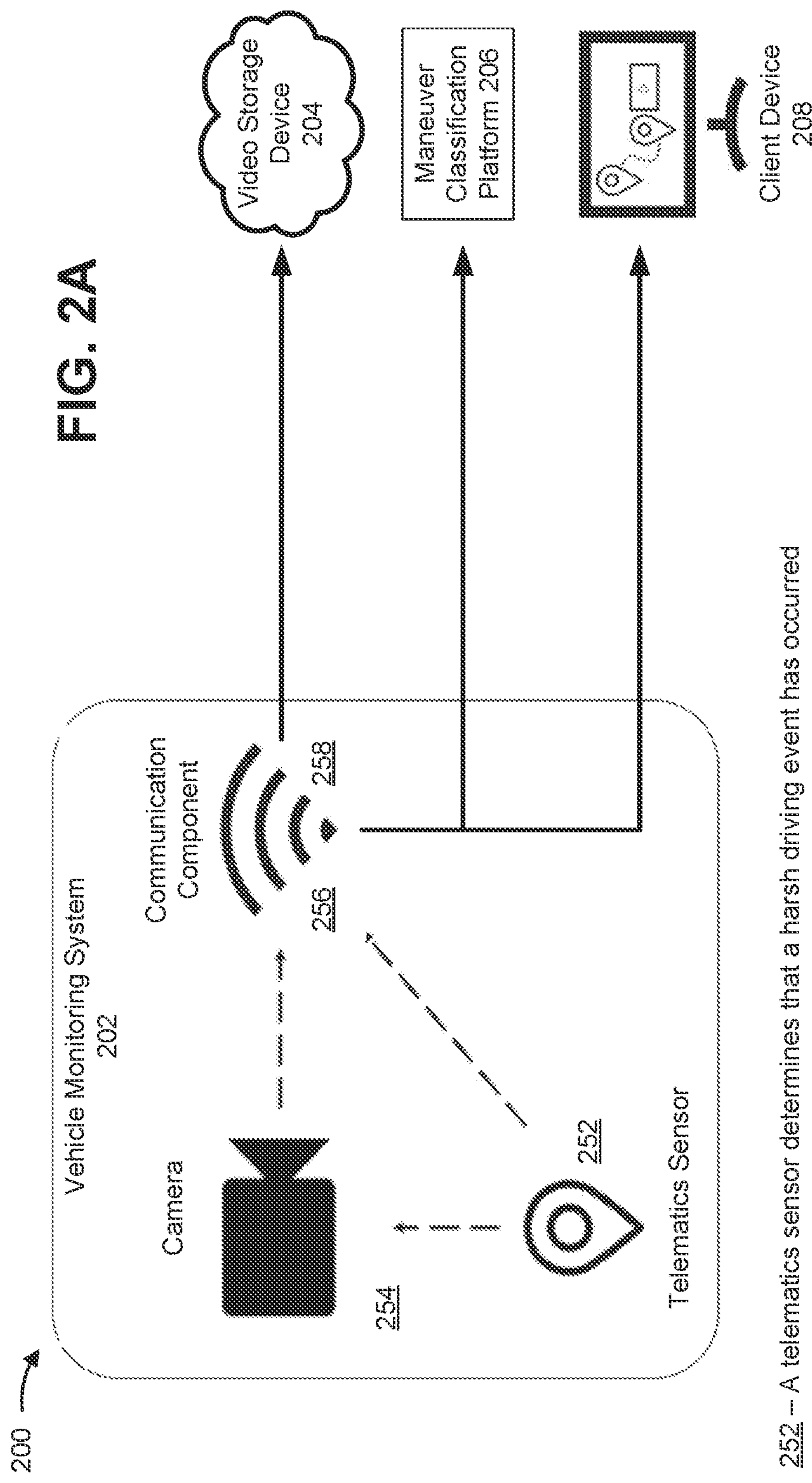

FIG. 2A

252 – A telematics sensor determines that a harsh driving event has occurred

254 – A camera collects video data regarding the harsh driving event

256 – A camera sends the video data to a communication component; the telematics sensor sends acceleration data and/or position data to the communication component 258 – The communication component sends the video data, the acceleration data, and/or the position data to a video storage device, a maneuver classification platform, and/or a client device 270 -- Store entry in data structure that identifies maneuver score and vehicle identifier 262 -- Provide notification associated with entry being added to the data structure and/or provide the maneuver score and the vehicle identifier 264 -- Receive authentication of maneuver score and train vehicle maneuver classification model

SYSTEMS AND METHODS FOR DETECTING AND CLASSIFYING AN UNSAFE MANEUVER OF A VEHICLE

CROSS-REFERENCE TO RELATED APPLICATION

This application is a continuation of U.S. patent application Ser. No. 16/947,918, entitled "SYSTEMS AND METHODS FOR DETECTING AND CLASSIFYING AN UNSAFE MANEUVER OF A VEHICLE," filed Aug. 24, 2020, which claims priority to Italian Application No. 102020000011368, filed on May 18, 2020, entitled "TECHNIQUES FOR SHARED RADIO FREQUENCY SPECTRUM CHANNEL CONFIGURATION," which are incorporated herein by reference in their entireties.

BACKGROUND

A dashboard camera can be mounted to a vehicle to capture video data related to the vehicle, a road the vehicle is traveling on, a path of the vehicle on the road, one or more objects on the road and/or in the path of the vehicle, and/or the like. Other sensor devices may be attached to or incorporated into the vehicle to capture data, such as a speedometer, an accelerometer, a location sensor, a steering angle sensor, and/or the like.

BRIEF DESCRIPTION OF THE DRAWINGS

FIGS. 2A-2C are diagrams of an example implementation described herein.

DETAILED DESCRIPTION OF PREFERRED EMBODIMENTS

Figure 1:
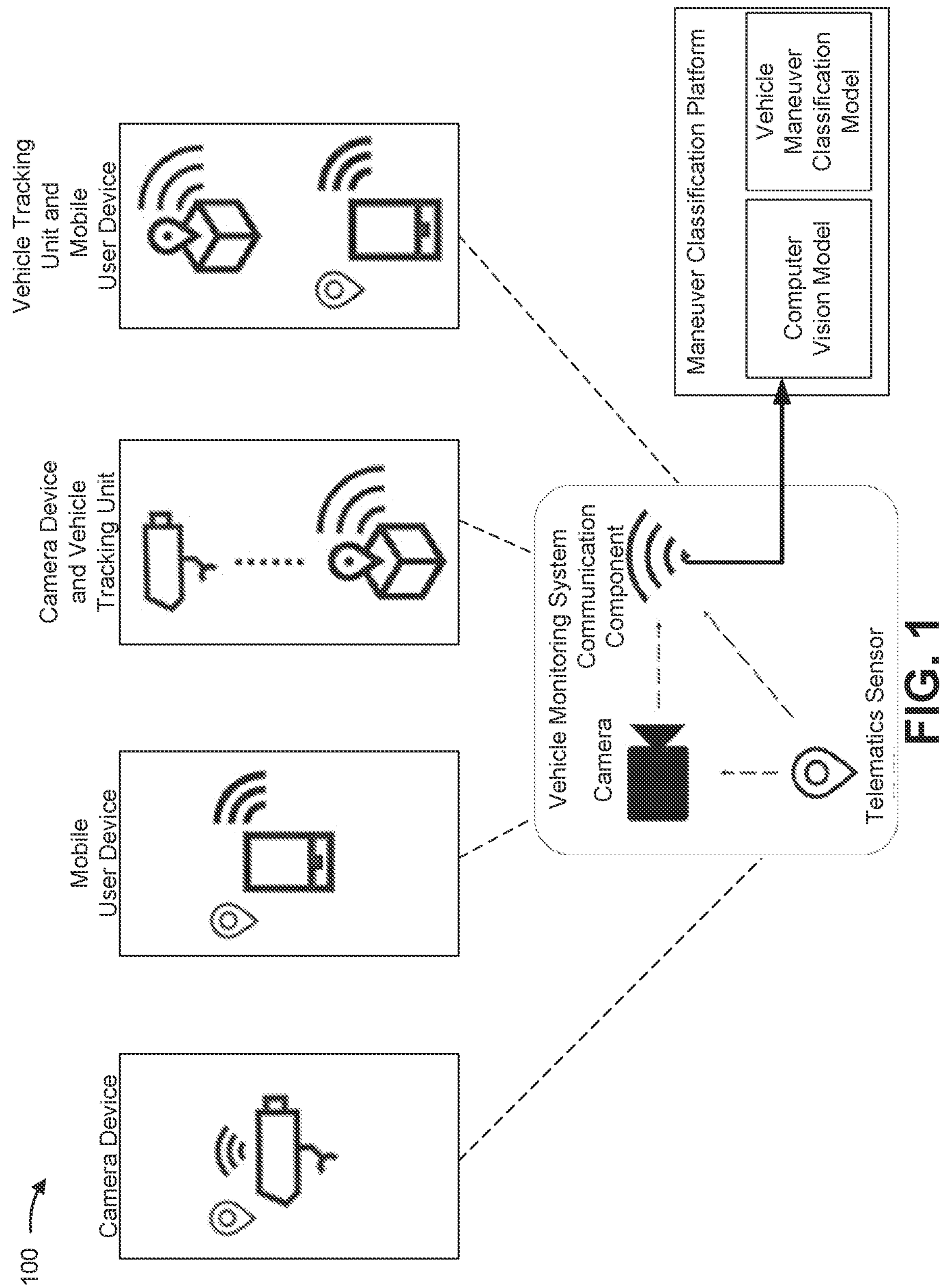
FIG. 1 is a diagram of an example implementation described herein.

The following detailed description of example implementations refers to the accompanying drawings. The same reference numbers in different drawings may identify the same or similar elements.

While driving a vehicle, a driver can experience a harsh driving event, such as a harsh braking event, a quick start event, a cornering event, a crash event, a near-crash event, an off-road event, and/or the like. Harsh driving events may be the result of an unsafe maneuver. For example, when a driver approaches an intersection at which the driver is to turn at an unsafe speed, the driver may experience a cornering event. Other times, the harsh driving event may not be the result of an unsafe maneuver. For example, when a first vehicle cuts off a second vehicle, a driver of the second vehicle may swerve to avoid the first vehicle, thereby resulting in a harsh driving event for the second vehicle. However, the second vehicle has not performed an unsafe maneuver (but instead, the harsh driving event was the result of an unsafe maneuver by the first vehicle). In another case, sensors on a vehicle man satisfy a threshold that can indicate an unsafe maneuver (e.g., an audio sensor may detect a sound that is interpreted as pertaining to a collision), but no unsafe maneuver may have occurred (e.g., the sound is a result of other vehicles within a threshold proximity experiencing a harsh driving event, the sound is actually caused by some other circumstance not related to a harsh driving event, etc.).

In some circumstances, the harsh driving event may be termed a safety-critical event and can create a dangerous situation for the driver, the vehicle, and/or other people and property. However, the driver might not be aware that he is performing unsafe maneuvers that can lead to a harsh driving event. Moreover, fleet managers who employ numerous drivers might not know whether the drivers exhibit unsafe maneuver behavior and/or create harsh driving events.

Some implementations described herein provide a vehicle monitoring system that is capable of collecting video data and/or other sensor data concerning a harsh driving event and a maneuver classification platform that is capable of identifying an unsafe maneuver. Moreover, the maneuver classification platform is capable of classifying whether an identified harsh driving event is a result of an unsafe maneuver by processing the video data and/or the other sensor data concerning the harsh driving event. In some implementations, the vehicle monitoring system can include a camera that stores video data files in a circular buffer, such that the camera can collect video data for a period of time concerning a harsh driving event that includes a first interval of time before the harsh driving event and a second interval of time after the harsh driving event.

In some implementations, the vehicle monitoring system can collect data concerning acceleration/deceleration of a vehicle, data concerning a position of the vehicle, and/or other types of telematics data. In some implementations, a maneuver classification platform can process the video data, the data concerning acceleration/deceleration of the vehicle, and the data concerning the position of the vehicle, the telematics data, and/or the like to determine features of the harsh driving event. In some implementations, a maneuver classification platform can assign a category to a maneuver preceding the harsh driving event based on a set of identified features in collected data. For example, a maneuver classification platform may classify a particular set of observed driving data as being related to an unsafe maneuver. In some implementations, a maneuver classification platform can send a message to a client device so that the client device can display information concerning the harsh driving event, the category, the video data, the data concerning acceleration/deceleration of the vehicle, the telematics data, the data concerning the position of the vehicle, and/or the like.

In this way, implementations described herein can alert fleet managers and/or drivers of harsh driving events and unsafe maneuvers associated therewith and/or provide tools for reviewing unsafe maneuvers after the harsh driving events happen. Implementations described herein may provide drivers with information that can be used to change the driving behavior of the drivers (e.g., by enabling the drivers to recognize and avoid unsafe maneuvers). Similarly, implementations described herein can allow the fleet managers to create safe driving training materials and/or guidelines, which can prevent or reduce the frequency of unsafe maneuvers and of resulting harsh driving events in the future. This can result in the increased safety of the drivers, the vehicles that the drivers operate, and other people and property. This can also result in less wear-and-tear on the vehicles or vehicle components, which can reduce costs associated with maintaining the vehicles.

Furthermore, implementations described herein are automated and can capture and process numerous (e.g., hundreds, thousands, millions, billions, and/or the like) data points to classify numerous harsh driving events at the same time. This can improve speed and efficiency of the process and conserve computing resources (e.g., processor resources, memory resources, and/or the like) of the vehicle monitoring system, the video classification platform, and/or the client device. Furthermore, implementations described herein use a rigorous, computerized process to perform tasks or roles that were not previously performed or were previously performed using subjective human intuition or input. For example, currently there does not exist a technique to automatically collect information concerning driving behaviors and/or process the information concerning the driving behaviors to classify the driving behaviors as unsafe maneuvers that may result in harsh driving events. Finally, implementations described herein conserve computing resources (e.g., processor resources, memory resources, and/or the like) that would otherwise be wasted in attempting to assist a human in collecting information concerning an unsafe maneuver and/or classifying the unsafe maneuver by hand.

FIG. 1 is a diagram of an example 100 associated with detecting and classifying an unsafe maneuver of a vehicle. As shown in FIG. 1, example implementation 100 can include a vehicle monitoring system that can be used by a vehicle. In some implementations, the vehicle monitoring system can include a camera device, a mobile user device, a vehicle tracking unit device, and/or a similar device that is capable of capturing data concerning a harsh driving event, an unsafe maneuver, and/or the like. In some implementations, the vehicle monitoring system can determine that an unsafe maneuver has occurred and collect video data concerning the harsh driving event.

In some implementations, the vehicle monitoring system can be mounted and/or affixed to the vehicle (e.g., on a dashboard of the vehicle, on a windshield of the vehicle, and/or the like). In some implementations, the vehicle monitoring system can include a camera (e.g., a dashboard camera, sometimes referred to as a "dash cam," a video camera, and/or the like). In some implementations, the vehicle monitoring system can be mounted and/or affixed to the vehicle such that the camera is pointed in a direction in which the vehicle is traveling. In some implementations, the camera can capture video data (e.g., record the video data and store the video data) concerning the vehicle, the trajectory of the vehicle, a road on which the vehicle is traveling, one or more objects on and/or near the road (e.g., other vehicles, sign posts, guard rails, road debris, people, animals, and/or the like), and/or the like. For example, the camera may capture a plurality of video frames, where one video frame includes information for a specific moment in time. In some implementations, the video data has a frame rate (e.g., a quantity of video frames per second). In some implementations, the vehicle monitoring system can include one or more cameras that are front-facing (e.g., pointed to the front of the vehicle), rear-facing (e.g., pointed to the back of the vehicle), and/or side-facing (e.g., pointed to the side of the vehicle), and/or the like.

In some implementations, the vehicle monitoring system can include a telematics sensor. For example, the vehicle monitoring system may include an accelerometer that collects data concerning acceleration and/or deceleration of the vehicle (e.g., an acceleration rate, an acceleration direction, a maximum acceleration, a start time of an acceleration event, and/or the like. Additionally, or alternatively, the vehicle monitoring system can include a global positioning system (GPS) sensor that collects data concerning a position of the vehicle. For example, the data concerning the position of the vehicle can include a location of the vehicle (e.g., represented as a latitude and longitude pair), a time of the location of the vehicle (e.g., when the vehicle is at the location), a direction of the vehicle (e.g., which way the vehicle is pointing, such as in degrees away from north, where north is represented by 0 degrees), a distance from a last recorded location of the vehicle, and/or the like.

In some implementations, the vehicle monitoring system can include a communication component. For example, the vehicle monitoring system may include a wireless communication device to facilitate communication between the vehicle monitoring system and one or more other devices. In this case, the communication component can transmit the video data, data concerning an acceleration/deceleration of the vehicle, data concerning a position of the vehicle, and/or the like to the one or more other devices.

As an example, as shown in FIG. 1, the vehicle can use a camera device, such as a smart dashboard camera, as the vehicle monitoring system (where the camera device includes the camera), the telematics sensor (which includes the accelerometer and the GPS sensor), and the communication component. As another example, the vehicle can use a mobile user device (such as a cellular phone) as the vehicle monitoring system (where the mobile user device includes the camera), the telematics sensor (which includes the accelerometer and the GPS sensor), and the communication component.

In a further example, as shown in FIG. 1, the vehicle monitoring system of the vehicle can comprise a camera device (such as a basic dashboard camera), and a vehicle tracking unit device, where the camera device includes the camera and the vehicle tracking unit device includes the telematics sensor (which includes the accelerometer and the GPS sensor), and the communication component. In some implementations, the vehicle tracking unit device is an internal component of the vehicle. In some implementations, the camera device and the vehicle tracking unit device can communicate with each other to share information (e.g., by a wireless and/or wired connection).

In an additional example, the vehicle monitoring system of the vehicle can comprise a vehicle tracking unit device and a mobile user device. In some implementations, the vehicle tracking unit device can include the GPS sensor and a first communication component, and the mobile user device can include the camera, the accelerometer, and a second communication component. In some implementations, the vehicle tracking unit device cannot directly communicate with the mobile user device, so the vehicle tracking unit device and the mobile user device can transmit, respectively, data to the one or more other devices via the first communication component of the vehicle tracking unit device and the second communication component of the mobile user device.

As further shown in FIG. 1, the communication component of the vehicle monitoring system may communicate with a maneuver classification platform. For example, the vehicle monitoring system may provide stored or real-time data regarding operation of a vehicle for processing by maneuver classification platform 206. In some implementations, maneuver classification platform 206 may include a computer vision model, a vehicle maneuver classification model, and/or the like. For example, as described in more detail herein, maneuver classification platform 206 may perform path analysis, object detection, and/or the like on video data captured by a camera of the vehicle monitoring system by, in some implementations using the computer vision model. Additionally, or alternatively, maneuver classification platform 206 may use other techniques to analyze data captured by one or more sensors of the vehicle monitoring system.

Based at least in part on telematics data, results of processing using the computer vision model, and/or the like, maneuver classification platform 206 may use a vehicle maneuver classification model to determine whether a performed vehicle maneuver is to be classified as an unsafe maneuver (e.g., a maneuver that is predicted to a have a threshold likelihood of resulting in a potential collision, a near collision, an actual collision and/or the like), as described herein. In this case, using computer vision applied to video data may enable maneuver classification with a reduced set of sensors and/or with reduced cost (e.g., lower-fidelity, inexpensive) sensors relative to other techniques that use extensive sensor data to determine a status of a vehicle and classify maneuvers associated therewith. For example, based at least in part on detecting an object in a path of a vehicle using the computer vision model, the vehicle maneuver classification model may provide output indicating that a swerve event associated with a particular acceleration, steering angle, etc. is not classified as an unsafe maneuver (in other words, the vehicle maneuver classification model may determine that the maneuver was necessary to avoid the object). In contrast, when an object is not detected in the path of a vehicle, maneuver classification platform may determine, using the vehicle maneuver classification model, that a similar swerve event (e.g., associated with the particular acceleration, steering angle, and/or the like) is classified as an unsafe maneuver. In this way, the maneuver classification platform combines video data, telematics data, and/or the like with machine learning techniques, as described in more detail herein, to classify vehicle maneuvers.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2B:
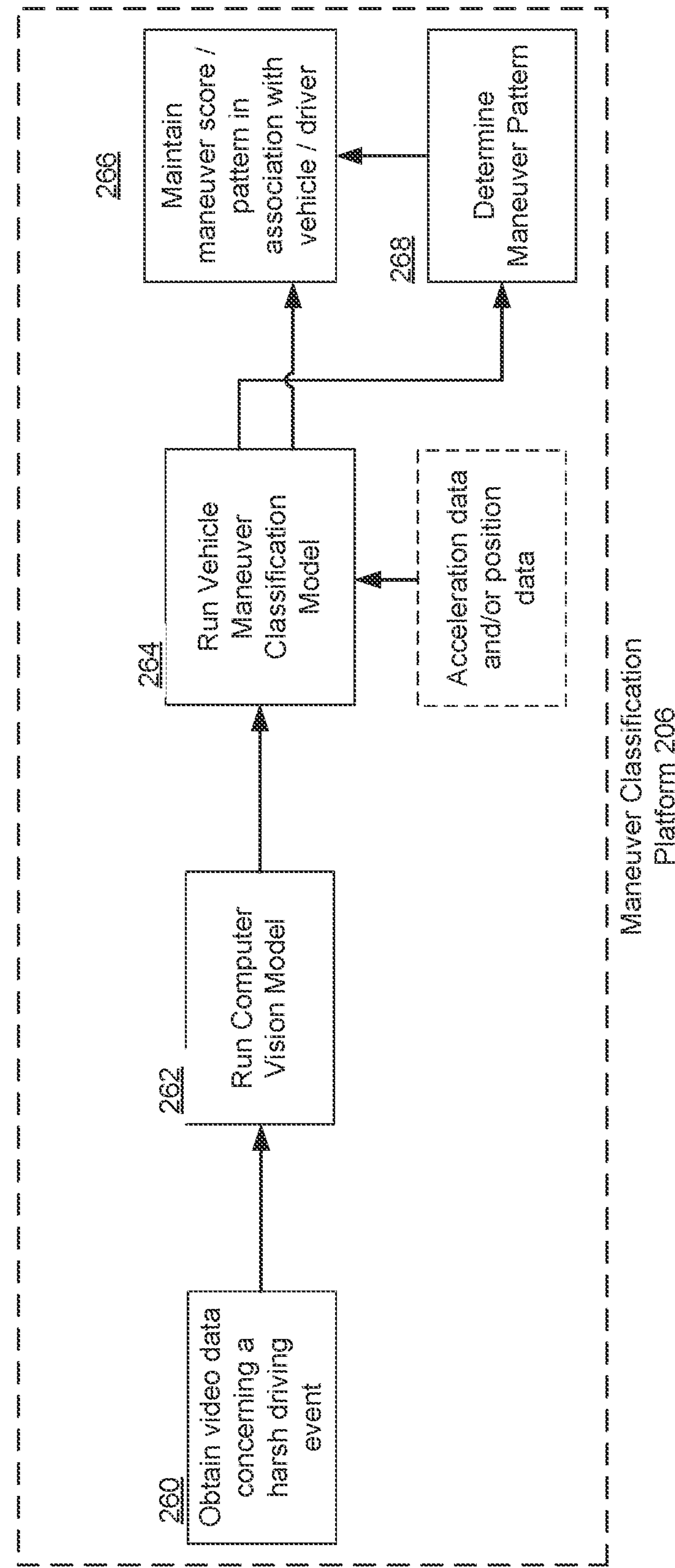
Figure 2C:
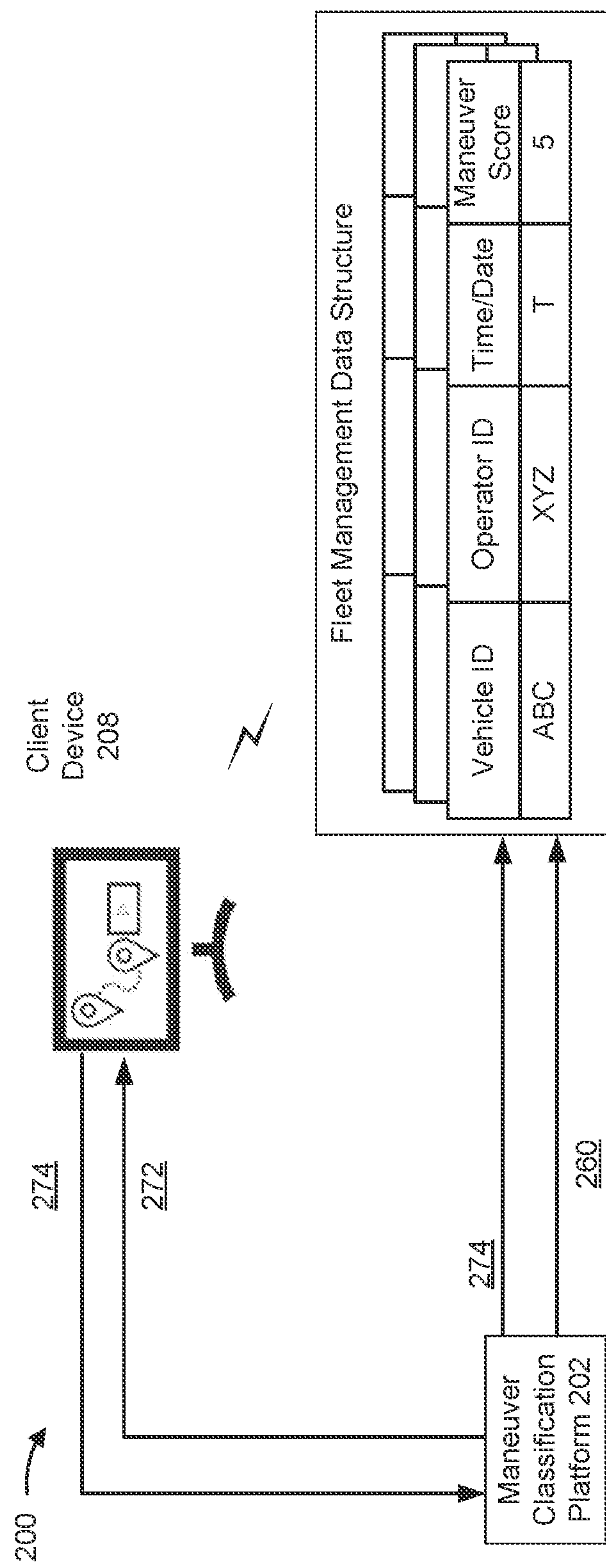

FIGS. 2A-2C are diagrams of an example 200 associated with classifying an unsafe maneuver of a vehicle. As shown in FIGS. 2A-2C, example 200 includes a vehicle monitoring system 202, a video storage device 204, a maneuver classification platform 206, and a client device 208.

As further shown in FIG. 2A, and by reference number 252, the telematics sensor of the vehicle monitoring system can determine that a harsh driving event has occurred. For example, the telematics sensor can process data concerning the acceleration/deceleration of the vehicle (e.g., a rapid increase in the acceleration rate of the vehicle, a rapid decrease in the acceleration rate of the vehicle, the acceleration rate of the vehicle satisfies a threshold, the acceleration direction of the vehicle suddenly changes, and/or the like) to determine that the harsh driving event has occurred. Additionally, or alternatively, maneuver classification platform 206 and vehicle monitoring system 202 may determine that a harsh driving event has occurred and may be triggered to perform maneuver classification based at least in part on another type of trigger. For example, vehicle monitoring system 202 may receive other sensor data, such as data from a collision sensor, an audio sensor, an output of a machine learning model processing video data from a camera, one or more sensors of, for example, a mobile device (e.g., an accelerometer, a location sensor, an audio sensor, a gyroscope, etc.), and/or the like and may detect a harsh driving event based on the other sensor data. Additionally, or alternatively, vehicle monitoring system 202 may detect a user interaction with a button, a user interaction with a user interface, a voice command, and/or the like, which vehicle monitoring system 202 may interpret as a trigger for performing maneuver classification.

Additionally, or alternatively, the telematics sensor can detect, via an accelerometer, a sudden decrease in an acceleration rate of the vehicle (e.g., the acceleration rate of the vehicle decreases by more than a threshold amount during an amount of time) and determine that a harsh driving event (e.g., a hard braking event) has occurred. In this case, based at least in part on a determination that a harsh driving event has occurred, vehicle monitoring system 202 may trigger a determination of whether an unsafe maneuver preceded the harsh driving event.

Additionally, or alternatively, vehicle monitoring system 202 may trigger a determination of whether an unsafe maneuver has occurred without having detected a harsh driving event. For example, vehicle monitoring system 202 may monitor a vehicle and perform determinations regarding whether unsafe maneuvers are occurring in real-time based on monitoring the vehicle. In this way, vehicle monitoring system 202 enables tracking of vehicle operators to determine whether the vehicle operators are to be provided with training materials to reduce unsafe maneuvers, even without a harsh driving event having occurred. Additionally, or alternatively, maneuver classification platform 206 may periodically determine whether an unsafe maneuver has occurred autonomously. For example, a user of client device 208 may request a determination of whether an unsafe maneuver occurred at a particular time or location (without a harsh driving event having been recorded), and maneuver classification platform 206 may obtain stored data regarding the particular time or location to perform a determination of whether an unsafe maneuver has occurred.

As further shown in FIG. 2A, and by reference number 254, the camera of vehicle monitoring system 202 collects video data regarding the harsh driving event. For example, the camera, which continuously captures video data (e.g., records the video data and caches the video data), may receive an indication of the harsh driving event from the telematics sensor and may store cached video data for further analysis. In some implementations, the indication may include information identifying a start time of the harsh driving event, an end time of the harsh driving event, and/or the like. In this case, the camera may store video data that was captured during the harsh driving event, for a threshold amount of time before the harsh driving event (e.g., to capture a potential unsafe maneuver leading to the harsh driving event), for a threshold amount of time after the harsh driving event (e.g., to capture a result of the harsh driving event, such as a collision or near-collision), and/or the like.

In this way, the camera can collect the video data for a period of time that shows what happened prior to the harsh driving event and after the harsh driving event.

As further shown in FIG. 2A, and by reference number 256, the camera can send the video data to the communication component. For example, the camera may send video data regarding the harsh driving event to the communication component for transmission. Additionally, or alternatively, the telematics sensor can send the data concerning acceleration/deceleration of the vehicle, the data concerning the position of the vehicle, and/or the like to the communication component. As shown by reference number 258, the communication component can send the video data, the data concerning the acceleration/deceleration of the vehicle, the data concerning the position of the vehicle, and/or the like to video storage device 204, maneuver classification platform 206, and/or to client device 208.

As shown in FIG. 2B, and by reference numbers 260 and 262, based at least in part on obtaining video data from vehicle monitoring system 202, maneuver classification platform 206 may run a computer vision model to process the video data. For example, maneuver classification platform 206 may process the video data using a classification pipeline to process each video frame (or a subset of video frames) of a plurality of video frames that comprise the video data. In this case, by processing a subset of set of video frames (e.g., every other video frame, video frames with a threshold difference from previous video frames, and/or the like), maneuver classification platform 206 may minimize the use of processing resources and memory resources of the video classification platform that would otherwise be used to process each video frame of all of the plurality of video frames.

In some implementations, the classification pipeline can include multiple phases to enable classification of whether an unsafe maneuver has occurred. In a first phase, maneuver classification platform 206 can process a video frame to identify one or more objects. For example, maneuver classification platform 206 can use an object detection algorithm to identify the one or more objects in a video frame. In some implementations, maneuver classification platform 206 can process the video frame using a convolutional neural network to determine the one or more objects. Based at least in part on applying a computer vision model, details of which are described in more detail below, maneuver classification platform 206 can classify one or more objects appearing in video data, captured in temporal proximity to a potential unsafe maneuver, into a particular category of object, such as a vehicle, a car, a truck, a person, a motorcycle, a bike, a motorbike, an animal, a street sign, a stop sign, a traffic light, and/or the like.

In a second phase of the classification pipeline, maneuver classification platform 206 can construct a collision cone of the vehicle for the video frame. The collision cone can be the area of the video frame that represents the path along which the vehicle will travel given the vehicle's trajectory in the video frame. For example, maneuver classification platform 206 can construct the collision cone of the vehicle for the video frame by computing an optical flow of the video frame and determining a vanishing point of the video frame. In some implementations, maneuver classification platform 206 can use an optical flow algorithm to compute the optical flow of the video frame. For example, maneuver classification platform 206 can process the video frame using Farneback's algorithm to compute the optical flow of the video frame. In some implementations, maneuver classification platform 206 can use a vanishing point algorithm to determine the vanishing point of the video frame. For example, maneuver classification platform 206 can process the video frame using a random sample consensus (RANSAC) algorithm to determine the vanishing point of the video frame.

In a third phase of the classification pipeline, maneuver classification platform 206 can determine a set of objects of the one or more objects in the video frame that have a potential to collide with the vehicle. For example, maneuver classification platform 206 can determine the set of objects of the one or more objects in the video frame that have the potential to collide with the vehicle based on determining motion of the one or more objects and calculating a time to collision of the one or more objects. In this case, maneuver classification platform 206 can determine the motion of the one or more objects based on the optical flow of the video frame. In some implementations, maneuver classification platform 206 can calculate the time to collision of the one or more objects by comparing the motion of the one or more objects and the collision cone of the vehicle.

In a fourth phase of the classification pipeline, as shown by reference number 264, maneuver classification platform 206 may run the vehicle maneuver classification model using results of running the computer vision model, using telematics data, and/or the like. For example, maneuver classification platform 206 can determine whether vehicle movement prior to the harsh driving event is to be classified as an unsafe maneuver. In some implementations, maneuver classification platform 206 can assign a classification to the harsh driving event based on the set of objects, the collision cone, the one or more objects, the data concerning acceleration/deceleration of the vehicle, the data concerning the position of the vehicle, and/or the like. For example, maneuver classification platform 206 may use a machine learning algorithm, as described in more detail with regard to FIGS. 3 and 4, to classify a maneuver as an unsafe maneuver based at least in part on telematics data, results of computer vision processing, and/or the like. In this case, based on the vehicle maneuver classification model, maneuver classification platform 206 can assign respective weights to one or more features concerning the harsh driving event (e.g., a presence of an object, a speed, an acceleration, a steering angle, and/or the like) to assign the category to the harsh driving event. In this way, maneuver classification platform 206 can assign the category to the maneuver preceding the harsh driving event in a manner that optimizes the processing resources of the video classification platform.

In some implementations, maneuver classification platform 206 may generate a maneuver score in connection with running the vehicle maneuver classification model. For example, maneuver classification platform 206 may generate the maneuver score based at least in part on a type of obstruction identified in the video data, a probability that a vehicle maneuver was performed to avoid the obstruction, a probability that a different vehicle maneuver (e.g., a vehicle maneuver classified as safer in historical data of vehicle maneuvers) would have successfully avoided the obstruction, a lack of an obstruction identified from the video data, and/or the like.

In some implementations, as shown by reference number 266, maneuver classification platform 206 may identify a maneuver pattern based at least in part on the maneuver score. For example, maneuver classification platform 206 may compare the maneuver score with other maneuver scores in a fleet management data structure (as shown in FIG. 2C) and identify a pattern of unsafe maneuvers by a particular operator, by a particular vehicle, and/or the like. In this case, maneuver classification platform 206 may use a pattern recognition model to identify a threshold quantity of unsafe maneuvers within a threshold period of time, a threshold rate of unsafe maneuvers in connection with harsh driving events, and/or the like. In this way, maneuver classification platform 206 may automatically identify vehicles with mechanical issues that may be causing unsafe maneuvers, operators that can be provided training materials to reduce a rate of unsafe maneuvers, and/or the like. In some implementations, when the particular vehicle is an autonomous vehicle, maneuver classification platform 206 may classify performance of the autonomous vehicle based at least in part on whether a maneuver is an unsafe maneuver, based at least in part on a maneuver pattern, and/or the like. For example, maneuver classification platform 206 may score the autonomous vehicle for safety and/or may provide automatic messaging to an autonomous vehicle provider indicating a need for a software update to address a maneuver pattern of unsafe maneuvers.

Based at least in part on generating a maneuver score and/or identifying a maneuver pattern, maneuver classification platform 206 may associate the maneuver score and/or the maneuver pattern with the vehicle, an operator of the vehicle, a location of the vehicle, a timestamp at which the harsh driving event occurred, and/or the like, as shown by reference number 268. In some implementations, maneuver classification platform 206 can generate a message based at least in part on classifying the vehicle maneuver or maneuver pattern. For example, maneuver classification platform 206 can generate a message that indicates that the harsh driving event is associated with an unsafe maneuver or is not a result of an unsafe maneuver. In some implementations, the message can include the video data, the data concerning the acceleration/deceleration of the vehicle, the data concerning the position of the vehicle, and/or the like.

In some implementations, maneuver classification platform 206 can send the message to client device 208 to permit client device 208 to display information identifying the unsafe maneuver, the video data, the data concerning the acceleration/deceleration of the vehicle, and/or the data concerning the position of the vehicle at client device 208.

For example, as shown in FIG. 2C and by reference number 270, maneuver classification platform 206 can send the message to client device 208 for storage in a fleet management data structure. Additionally, or alternatively, maneuver classification platform 206 may store the fleet management data structure on behalf of client device 208. In this case, maneuver classification platform 206 may include information identifying a vehicle, an operator, a time of day, a maneuver score, a location, a maneuver pattern, and/or the like in an entry of the fleet management data structure.

As further shown in FIG. 2C, and by reference numbers 272 and 274, maneuver classification platform 206 may communicate with client device 208 to provide a notification regarding the maneuver score and/or receive confirmation information, which maneuver classification platform 206 may use to update the fleet management data structure and/or one or more models used by maneuver classification platform 206. For example, maneuver classification platform 206 may provide a notification of the maneuver score or maneuver pattern to a client device 208 used by a fleet manager. In some implementations, the notification may include an automatically generated video clip of the unsafe maneuver. For example, maneuver classification platform 206 may select frames of video data relating to the harsh driving event that correspond to the unsafe maneuver preceding the harsh driving event, and may generate a video file of the selected frames. In some implementations, maneuver classification platform 206 may generate an overlay of contextual data for the video file. For example, maneuver classification platform 206 may overlay telematics data, location data, and/or the like in the video file for review by the fleet manager. In some implementations, maneuver classification platform 206 may generate a virtual reality file for display. For example, maneuver classification platform 206 may combine video data from a plurality of sources (e.g., a dashboard camera as well as other on-vehicle cameras (a backup camera, a mirror camera, etc.), publicly available video sources within a threshold proximity of the harsh driving event, etc.) to generate a virtual reality file. In this case, maneuver classification platform 206 may push the virtual reality file to a virtual reality display type of client device 208 for review.

In this way, maneuver classification platform 206 enables auditing of results of classifying the maneuver as unsafe. For example, the fleet manager may confirm that maneuver classification platform 206 is correct in classifying the maneuver as an unsafe maneuver (e.g., after viewing the video file) and may provide confirmation via client device 208. In this case, maneuver classification platform 206 may update the maneuver classification model based at least in part on the fleet manager confirming the classification. In this way, maneuver classification platform 206 enables supervised machine learning.

In some implementations, maneuver classification platform 206 may provide information to permit client device 208 to display, via a user interface of the display, an icon on a map that indicates a harsh driving event, a category of maneuver (e.g., unsafe, safe, or any other possible category) relating to the harsh driving event, and/or a location of the vehicle associated with the harsh driving event. In some implementations, the user interface can display a menu that includes information regarding trips made by the vehicle. In some implementations, a user of client device 208 can select a trip and the user interface can display a map that shows the route associated with the trip and one or more icons that indicate one or more harsh driving events. In some implementations, for an icon of the one or more icons, a color of the icon can indicate a category of the associated harsh driving event (e.g., an orange icon indicates an unsafe maneuver causing harsh driving event, a blue icon indicates a safe maneuver prior to the harsh driving event, and/or the like).

As indicated above, FIGS. 2A-2C are provided as an example. Other examples may differ from what is described with regard to FIGS. 2A-2C. The number and arrangement of devices shown in FIGS. 2A-2C are provided as an example. In practice, there may be additional devices, fewer devices, different devices, or differently arranged devices than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) shown in FIGS. 2A-2C may perform one or more functions described as being performed by another set of devices shown in FIGS. 2A-2C.

Figure 3:
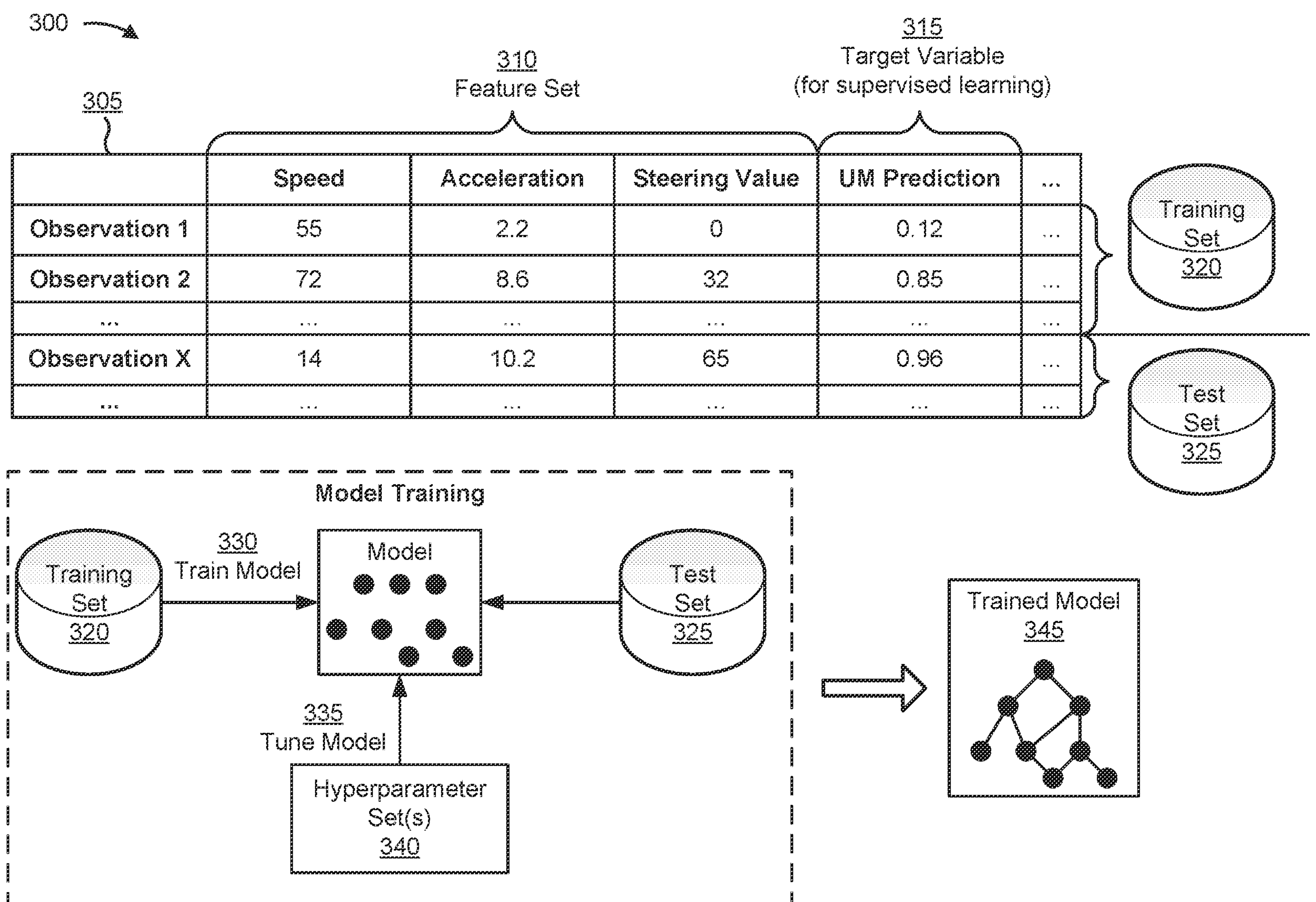
FIG. 3 is a diagram illustrating an example of training a machine learning model in connection with detecting and classifying an unsafe maneuver of a vehicle.

FIG. 3 is a diagram illustrating an example 300 of training a machine learning model in connection with detecting and classifying an unsafe maneuver for a vehicle. The machine learning model training described herein may be performed using a machine learning system. The machine learning system may include or may be included in a computing device, a server, a cloud computing environment, and/or the like, such as maneuver classification platform 501, cloud computing system 502, and/or the like described in more detail below.

As shown by reference number 305, a machine learning model may be trained using a set of observations. The set of observations may be obtained and/or input from historical data (e.g., historical telematics data, historical video data, and/or the like), such as data gathered during one or more processes described herein. For example, the set of observations may include data gathered from vehicle monitoring system 520, as described elsewhere herein. In some implementations, the machine learning system may receive the set of observations (e.g., as input) from vehicle monitoring system 520.

As shown by reference number 310, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from vehicle monitoring system 520. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variable types) for a feature set based on input received from vehicle monitoring system 520, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of vehicle speed (e.g., absolute speed, angular speed, and/or the like), a second feature of vehicle acceleration (e.g., absolute acceleration, angular acceleration, and/or the like), a third feature of a steering value (e.g., an angle of a steering wheel), and so on. As shown, for a first observation, the first feature may have a value of 55, the second feature may have a value of 2.2, the third feature may have a value of 0, and so on. These features and feature values are provided as examples, and may differ in other examples. For example, the feature set may include one or more of the following features: a vehicle type, a location, a time of day, a weather condition, a light condition, a tachometer value, one or more values from a previous service appointment for the vehicle (e.g., a tire alignment, a tire tread thickness, a tire pressure, and/or the like. Other features may include features related to an object identified using another model (e.g., a computer vision model, which may be similar to a maneuver classification model described herein, may provide, as output, a percentage confidence than an object is identified, a size of the object, a speed of the object, and/or the like, as described above). In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 315, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values. In example 300, the target variable is an unsafe maneuver (UM) prediction, which has a value of 0.12 for the first observation. In this case, based at least in part on the unsafe maneuver prediction satisfying a threshold, a prediction that an unsafe maneuver has occurred may be generated.

The feature set and target variable described above are provided as examples, and other examples may differ from what is described above. For example, for a target variable of maneuver pattern, the feature set may include unsafe maneuver predictions, harsh driving events, time, and/or the like. Additionally, or alternatively, for a target variable of object detection, the feature set may include pixel data across a plurality of video frames and/or the like.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 320 that includes a first subset of observations, of the set of observations, and a test set 325 that includes a second subset of observations of the set of observations. The training set 320 may be used to train (e.g., fit, tune, and/or the like) the machine learning model, while the test set 325 may be used to evaluate a machine learning model that is trained using the training set 320. For example, for supervised learning, the test set 325 may be used for initial model training using the first subset of observations, and the test set 325 may be used to test whether the trained model accurately predicts target variables in the second subset of observations. In some implementations, the machine learning system may partition the set of observations into the training set 320 and the test set 325 by including a first portion or a first percentage of the set of observations in the training set 320 (e.g., 75%, 80%, or 85%, among other examples) and including a second portion or a second percentage of the set of observations in the test set 325 (e.g., 25%, 20%, or 15%, among other examples). In some implementations, the machine learning system may randomly select observations to be included in the training set 320 and/or the test set 325.

As shown by reference number 330, the machine learning system may train a machine learning model using the training set 320. This training may include executing, by the machine learning system, a machine learning algorithm to determine a set of model parameters based on the training set 320. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 320). For example, for a regression algorithm, a model parameter may include a regression coefficient (e.g., a weight). For a decision tree algorithm, a model parameter may include a decision tree split location, as an example.

As shown by reference number 335, the machine learning system may use one or more hyperparameter sets 340 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 320. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 320. The machine learning system may tune each machine learning algorithm using one or more hyperparameter sets 340 (e.g., based on operator input that identifies hyperparameter sets 340 to be used, based on randomly generating hyperparameter values, and/or the like). The machine learning system may train a particular machine learning model using a specific machine learning algorithm and a corresponding hyperparameter set 340. In some implementations, the machine learning system may train multiple machine learning models to generate a set of model parameters for each machine learning model, where each machine learning model corresponds to a different combination of a machine learning algorithm and a hyperparameter set 340 for that machine learning algorithm.

In some implementations, the machine learning system may perform cross-validation when training a machine learning model. Cross validation can be used to obtain a reliable estimate of machine learning model performance using only the training set 320, and without using the test set 325, such as by splitting the training set 320 into a number of groups (e.g., based on operator input that identifies the number of groups, based on randomly selecting a number of groups, and/or the like) and using those groups to estimate model performance. For example, using k-fold cross-validation, observations in the training set 320 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group $k-1$ times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 340 associated with a particular machine learning algorithm. The machine learning system may compare the overall cross-validation scores for different hyperparameter sets 340 associated with the particular machine learning algorithm, and may select the hyperparameter set 340 with the best (e.g., highest accuracy, lowest error, closest to a desired threshold, and/or the like) overall cross-validation score for training the machine learning model. The machine learning system may then train the machine learning model using the selected hyperparameter set 340, without cross-validation (e.g., using all of data in the training set 320 without any hold-out groups), to generate a single machine learning model for a particular machine learning algorithm. The machine learning system may then test this machine learning model using the test set 325 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 345 to be used to analyze new observations, as described below in connection with FIG. 4.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 320 (e.g., without cross-validation), and may test each machine learning model using the test set 325 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 345.

As indicated above, FIG. 3 is provided as an example. Other examples may differ from what is described in connection with FIG. 3. For example, the machine learning model may be trained using a different process than what is described in connection with FIG. 3. Additionally, or alternatively, the machine learning model may employ a different machine learning algorithm than what is described in connection with FIG. 3, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 4:
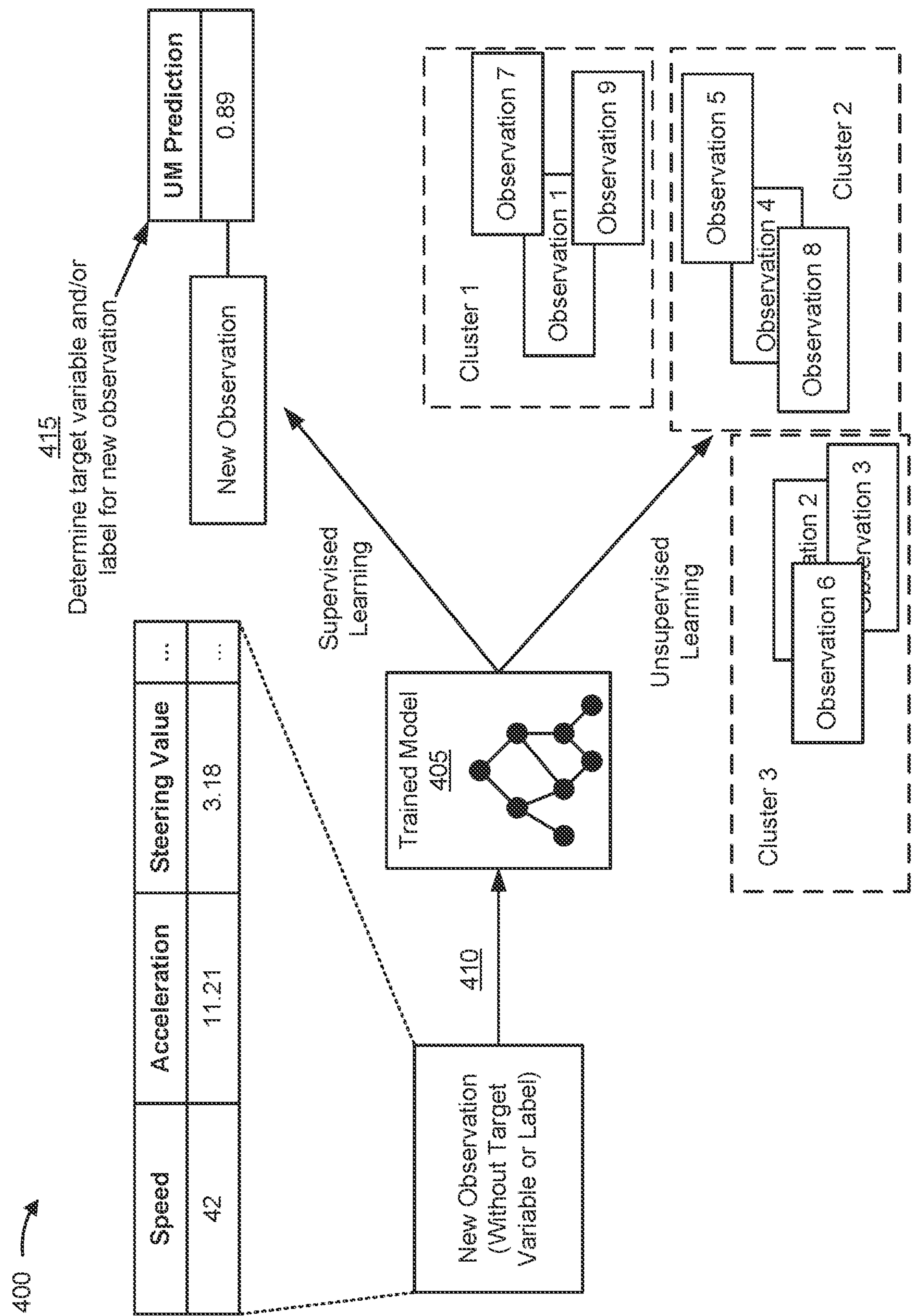
FIG. 4 is a diagram illustrating an example of applying a trained machine learning model to a new observation associated with detecting and classifying an unsafe maneuver of a vehicle.

FIG. 4 is a diagram illustrating an example 400 of applying a trained machine learning model to a new observation associated with detecting and classifying an unsafe maneuver of a vehicle. The new observation may be input to a machine learning system that stores a trained machine learning model 405. In some implementations, the trained machine learning model 405 may be the trained machine learning model 345 described above in connection with FIG. 3. The machine learning system may include or may be included in a computing device, a server, a cloud computing environment, and/or the like, such as maneuver classification platform 501, cloud computing system 502, and/or the like.

As shown by reference number 410, the machine learning system may receive a new observation (or a set of new observations), and may input the new observation to the machine learning model 405. As shown, the new observation may include a first feature of speed, a second feature of acceleration, a third feature of steering value, and so on, as an example. The machine learning system may apply the trained machine learning model 405 to the new observation to generate an output (e.g., a result). The type of output may depend on the type of machine learning model and/or the type of machine learning task being performed. For example, the output may include a predicted (e.g., estimated) value of a target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 405 may predict a value of 0.89 for the target variable of an unsafe maneuver prediction for the new observation, as shown by reference number 415. Based on this prediction (e.g., based on the value having a particular label or classification, based on the value satisfying or failing to satisfy a threshold, and/or the like), the machine learning system may provide a recommendation and/or output for determination of a recommendation, such as a determination that the maneuver was an unsafe maneuver, that a driver should be provided with safety materials, that a vehicle should be serviced, and/or the like. Additionally, or alternatively, the machine learning system may perform an automated action and/or may cause an automated action to be performed (e.g., by instructing another device to perform the automated action), such as generating a video clip of a harsh driving event resulting from the unsafe maneuver. As another example, if the machine learning system were to predict a value of 0.24 for the target variable of an unsafe maneuver, then the machine learning system may provide a different recommendation (e.g., that the maneuver was not an unsafe maneuver and that, for example, the harsh driving event was a result of another driver of another vehicle) and/or may perform or cause performance of a different automated action (e.g., not alerting a fleet manager of an unsafe maneuver). In some implementations, the recommendation and/or the automated action may be based on the target variable value having a particular label (e.g., classification, categorization, and/or the like), may be based on whether the target variable value satisfies one or more thresholds (e.g., whether the target variable value is greater than a threshold, is less than a threshold, is equal to a threshold, falls within a range of threshold values, and/or the like), and/or the like.

The recommendations, actions, and clusters described above are provided as examples, and other examples may differ from what is described above. For example, the recommendations associated with a maneuver pattern may include providing training materials for a driver, altering a driver schedule to avoid times of certain times of day (e.g., low light conditions, traffic conditions, and/or the like), promoting a driver (e.g., for a lack of a maneuver pattern indicating a lack of unsafe maneuvers), and/or the like.

In this way, the machine learning system may apply a rigorous and automated process to detect and classify an unsafe maneuver of a vehicle. The machine learning system enables recognition and/or identification of tens, hundreds, thousands, or millions of features and/or feature values for tens, hundreds, thousands, or millions of observations, thereby increasing accuracy and consistency and reducing delay associated with detecting and classifying an unsafe maneuver of a vehicle relative to requiring computing resources to be allocated for tens, hundreds, or thousands of operators to manually identify and classify an unsafe maneuver of a vehicle using the features or feature values.

As indicated above, FIG. 4 is provided as an example. Other examples may differ from what is described in connection with FIG. 4.

Figure 5:
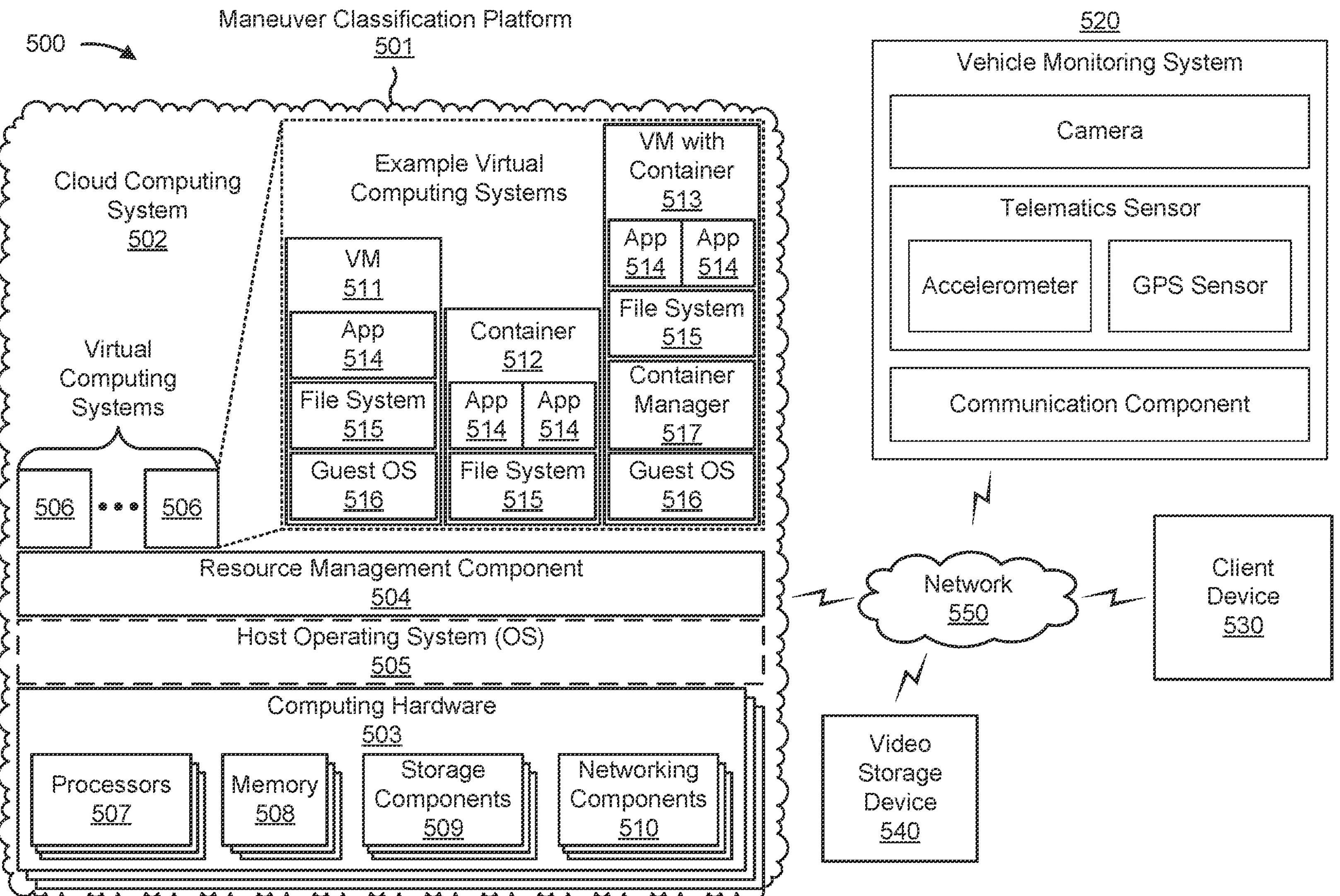
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a maneuver classification platform 501. Maneuver classification platform 501 may include one or more elements of a cloud computing system 502 and/or may execute within the cloud computing system 502 (e.g., as one or more virtual computing systems 506). The cloud computing system 502 may include one or more elements 503-517, as described in more detail below. As further shown in FIG. 5, environment 500 may include a vehicle monitoring system 520, a client device 530, a video storage device 540, and/or a network 550. Devices of environment 500 may interconnect via wired connections, wireless connections, or a combination of wired and wireless connections.

The cloud computing system 502 includes computing hardware 503, a resource management component 504, a host operating system (OS) 505, and/or one or more virtual computing systems 506. The resource management component 504 may perform virtualization (e.g., abstraction) of computing hardware 503 to create the one or more virtual computing systems 506. Using such virtualization, the resource management component 504 enables a single computing device (e.g., a computer, a server, a host device, and/or the like) to operate as if the single computing device were multiple computing devices, such as by creating multiple isolated virtual computing systems 506 from computing hardware 503 of the single computing device. The multiple virtual computing systems 506 operate independently from one another and do not interact with one another. In this way, computing hardware 503 can operate more efficiently, with lower power consumption, higher reliability, higher availability, higher utilization, greater flexibility, and lower cost than using separate computing devices.

Computing hardware 503 includes hardware and corresponding resources from one or more computing devices. For example, computing hardware 503 may include hardware from a single computing device (e.g., a single server or host device) or from multiple computing devices (e.g., multiple servers or host devices), such as multiple computing devices in one or more data centers, server farms, server pools, and/or the like. As shown, computing hardware 503 may include one or more processors 507, one or more memories 508, one or more storage components 509, and/or one or more networking components 510. Computing hardware 503 may be interconnected via one or more wired and/or wireless buses, which may interconnect computing hardware 503 within a single computing device and/or across multiple computing devices.

A processor 507 includes a central processing unit, a graphics processing unit, and/or the like. A memory 508 includes random-access memory, read-only memory, and/or the like. The memory 508 may store a set of instructions (e.g., one or more instructions) for execution by the processor 507. The processor 507 may execute the set of instructions to perform one or more operations or processes described herein. In some implementations, execution of the set of instructions, by one or more processors 507, causes the one or more processors 507 and/or maneuver classification platform 501 to perform one or more operations or processes described herein. A storage component 509 includes a hard disk or another type of storage device that stores information, data, and/or software (e.g., code, instructions, and/or the like) related to the operation and use of maneuver classification platform 501. In some implementations, memory 508 and/or storage component 509 is/are implemented as a non-transitory computer readable medium. A networking component 510 includes a network interface and corresponding hardware that enables maneuver classification platform 501 to communicate with other devices of environment 500 via a wired connection and/or a wireless connection, such as via network 550. Additional examples of a processor, a memory, a storage component, and a networking component (e.g., a communication interface) are described elsewhere herein.

The resource management component 504 includes a virtualization application (e.g., executing on hardware, such as computing hardware 503) capable of virtualizing computing hardware 503 to start (e.g., create or spin up), stop (e.g., delete or tear down), and/or manage one or more virtual computing systems 506. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 504 may control access to and/or use of computing hardware 503 and/or software executing on computing hardware 503. Additionally, or alternatively, the resource management component 504 may perform binary rewriting to scan instructions received from a virtual computing system 506 and replace any privileged instructions with safe emulations of those instructions. The resource management component 504 may include a hypervisor or a virtual machine monitor, such as when the virtual computing systems 506 are virtual machines 511. Additionally, or alternatively, the resource management component 504 may include a container manager, such as when the virtual computing systems 506 are containers 512.

In some implementations, the resource management component 504 executes within and/or in coordination with a host operating system 505. For example, the resource management component 504 may execute on top of the host operating system 505 rather than interacting directly with computing hardware 503, such as when the resource management component 504 is a hosted hypervisor (e.g., a Type 2 hypervisor) or a container manager. In this case, the host operating system 505 may control access to and/or use of computing hardware 503 and/or software executing on computing hardware 503 based on information and/or instructions received from the resource management component 504. Alternatively, the resource management component

504 may interact directly with computing hardware 503 rather than interacting with the host operating system 505, such as when the resource management component 504 is a bare-metal hypervisor (e.g., a Type 1 hypervisor). Thus, in some implementations, the cloud computing system 502 does not include a host operating system 505. In some implementations, the host operating system 505 includes and/or executes an administrator application to enable a system administrator to manage, customize, and/or configure cloud computing system 502.

A virtual computing system 506 includes a virtual environment that enables cloud-based execution of operations and/or processes described herein using computing hardware 503. As shown, a virtual computing system 506 may include a virtual machine 511, a container 512, a hybrid environment 513 that includes a virtual machine and a container, and/or the like. A virtual computing system 506 may execute one or more applications 514 using a file system 515. The file system 515 may include binary files, software libraries, and/or other resources required to execute applications 514 on a guest operating system 516 or the host operating system 505. In some implementations, a virtual computing system 506 (e.g., a virtual machine 511 or a hybrid environment 513) includes a guest operating system 516. In some implementations, a virtual computing system 506 (e.g., a container 512 or a hybrid environment 513) includes a container manager 517.

A virtual machine 511 is an emulation of a computing device that enables execution of separate, isolated instances of virtual computing devices (e.g., multiple virtual machines 511) on the same computing hardware 503. The guest operating systems 516 and applications 514 of multiple virtual machines 511 may share computing hardware 503 from a single computing device or from multiple computing devices (e.g., a pool of computing devices). Each separate virtual machine 511 may include a guest operating system 516, a file system 515, and one or more applications 514. With a virtual machine 511, the underlying computing hardware 503 is virtualized, and the guest operating system 516 executes on top of this virtualized hardware. Using virtual machines 511 enables different types of guest operating systems 516 to execute on the same computing hardware 503 in an isolated environment, but with more resource usage and overhead than containers 512.

Unlike a virtual machine 511, a container 512 virtualizes a host operating system 505 rather than the underlying computing hardware 503. Thus, a container 512 does not require a guest operating system 516 because the application(s) 514 included in the container 512 execute directly on the host operating system 505 using a file system 515 included in the container 512. Each separate container 512 may share the kernel of the host operating system 505, and different applications 514 within a single container 512 may share a file system 515. This sharing of a file system 515 among multiple applications 514 reduces the need to reproduce operating system code for different applications, and enables a single host operating system 505 to execute multiple applications 514 and/or containers 512. As a result, containers 512 enable a greater quantity of applications 514 to execute on a smaller quantity of computing devices as compared to virtual machines 511.

A hybrid environment 513 includes elements of a virtual machine 511 and a container 512. For example, a hybrid environment 513 may include a guest operating system 516 that executes on top of virtualized hardware. A container manager 517 may execute on top of the guest operating system 516 to start, stop, and/or manage one or more containers within the hybrid environment 513. Using a hybrid environment 513 enables different types of guest operating systems 516 to execute on the same computing hardware 503 in an isolated environment, while also enabling lightweight containers to execute on top of the guest operating system 516.

The quantity of applications 514 shown in FIG. 5 as executing within each virtual computing system 506 is shown as an example, and a different quantity of applications 514 may execute within each virtual computing system. Furthermore, although maneuver classification platform 501 may include one or more elements 503-517 of the cloud computing system 502, may execute within the cloud computing system 502, and/or may be hosted within the cloud computing system 502, in some implementations, maneuver classification platform 501 may not be cloud-based (e.g., may be implemented outside of a cloud computing system) or may be partially cloud-based. For example, maneuver classification platform 501 may include one or more devices that are not part of the cloud computing system 502, such as device 600 of FIG. 6, which may include a standalone server or another type of computing device. Maneuver classification platform 501 may perform one or more operations and/or processes described in more detail elsewhere herein.

Vehicle monitoring system 520 includes one or more devices capable of receiving, generating, storing, processing, and/or providing information associated with automatic collection of information concerning harsh driving events. For example, vehicle monitoring system 520 can include a camera, a telemetry device such as a telematics sensor, and/or a communication component (e.g., a mobile phone device, a wireless communication device, and/or the like). In some implementations, the camera can include a dashboard camera, a video camera, and/or the like, and can capture and collect video data concerning the vehicle, the trajectory of the vehicle, a road that the vehicle is traveling on, one or more objects on and/or near the road, and/or the like. In some implementations, the telematics sensor can include an accelerometer that collects data concerning acceleration/deceleration of the vehicle, and/or can include a global positioning system (GPS) sensor that collects data concerning a position of the vehicle. In some implementations, the communication component can facilitate communication between vehicle monitoring system 520 and the one or more other devices, such as video storage device 540, client device 530, and/or maneuver classification platform 501, via network 550.

Client device 530 includes one or more devices capable of receiving, generating, storing, processing, and/or providing information associated with automatic collection and classification of harsh driving events. For example, client device 530 can include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), or a similar type of device. In some implementations, client device 530 can display information concerning a harsh driving event, a category of the harsh driving event, video data concerning the harsh driving event, data concerning acceleration/deceleration of a vehicle, and/or data concerning a position of the vehicle.

Video storage device 540 includes one or more devices capable of receiving, generating, storing, processing, and/or providing video data associated with automatic collection of harsh driving events. For example, video storage device 540 can include a computing device, a server device, a data center device, or other device capable of receiving video data from vehicle monitoring system 520, storing the video data, and/or hosting the video data for download by maneuver classification platform 501 and/or client device 530.

Network 550 includes one or more wired and/or wireless networks. For example, network 550 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 550 enables communication among the devices of environment 500.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
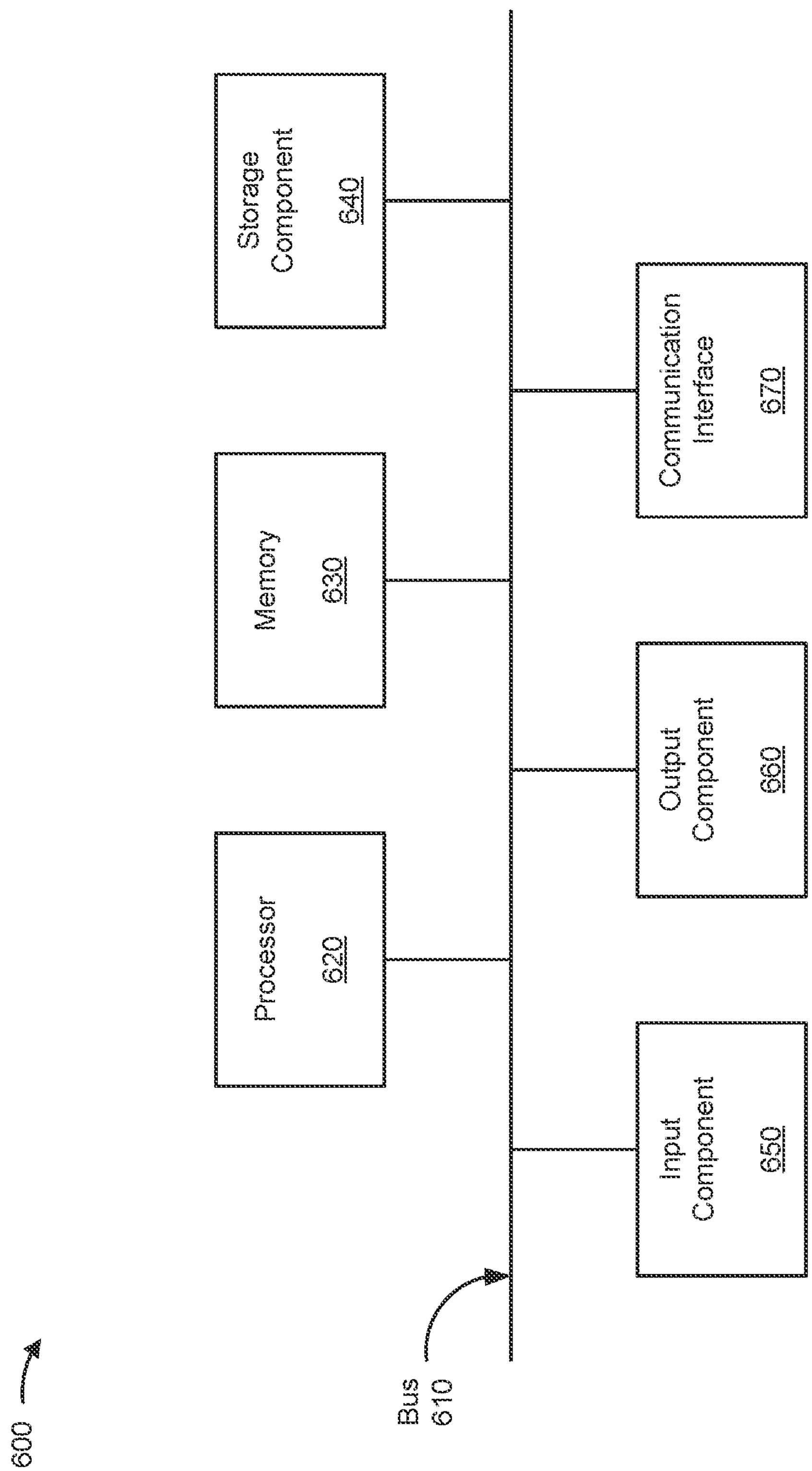
FIG. 6 is a diagram of example components of one or more devices of FIG. 5.

FIG. 6 is a diagram of example components of a device 600. Device 600 may correspond to maneuver classification platform 501, vehicle monitoring system 520, client device 530, and/or video storage device 540. In some implementations, maneuver classification platform 501, vehicle monitoring system 520, client device 530, and/or video storage device 540 may include one or more devices 600 and/or one or more components of device 600. As shown in FIG. 6, device 600 may include a bus 610, a processor 620, a memory 630, a storage component 640, an input component 650, an output component 660, and a communication interface 670.

Bus 610 includes a component that permits communication among the components of device 600. Processor 620 is implemented in hardware, firmware, or a combination of hardware and software. Processor 620 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 620 includes one or more processors capable of being programmed to perform a function. Memory 630 includes a random-access memory (RAM), a read only memory (ROM), and/or another type of dynamic or static storage device (e.g., a flash memory, a magnetic memory, and/or an optical memory) that stores information and/or instructions for use by processor 620.

Storage component 640 stores information and/or software related to the operation and use of device 600. For example, storage component 640 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 650 includes a component that permits device 600 to receive information, such as via user input (e.g., a touch screen display, a keyboard, a keypad, a mouse, a button, a switch, and/or a microphone). Additionally, or alternatively, input component 650 may include a sensor for sensing information (e.g., a global positioning system (GPS) component, an accelerometer, a gyroscope, and/or an actuator). Output component 660 includes a component that provides output information from device 600 (e.g., a display, a speaker, and/or one or more LEDs).

Communication interface 670 includes a transceiver-like component (e.g., a transceiver and/or a separate receiver and transmitter) that enables device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, an RF interface, a universal serial bus (USB) interface, a wireless local area interface, a cellular network interface, and/or the like.

Device 600 may perform one or more processes described herein. Device 600 may perform these processes based on processor 620 executing software instructions stored by a non-transitory computer-readable medium, such as memory 630 and/or storage component 640. A computer-readable medium is defined herein as a non-transitory memory device. A memory device includes memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 6 are provided as an example. In practice, device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
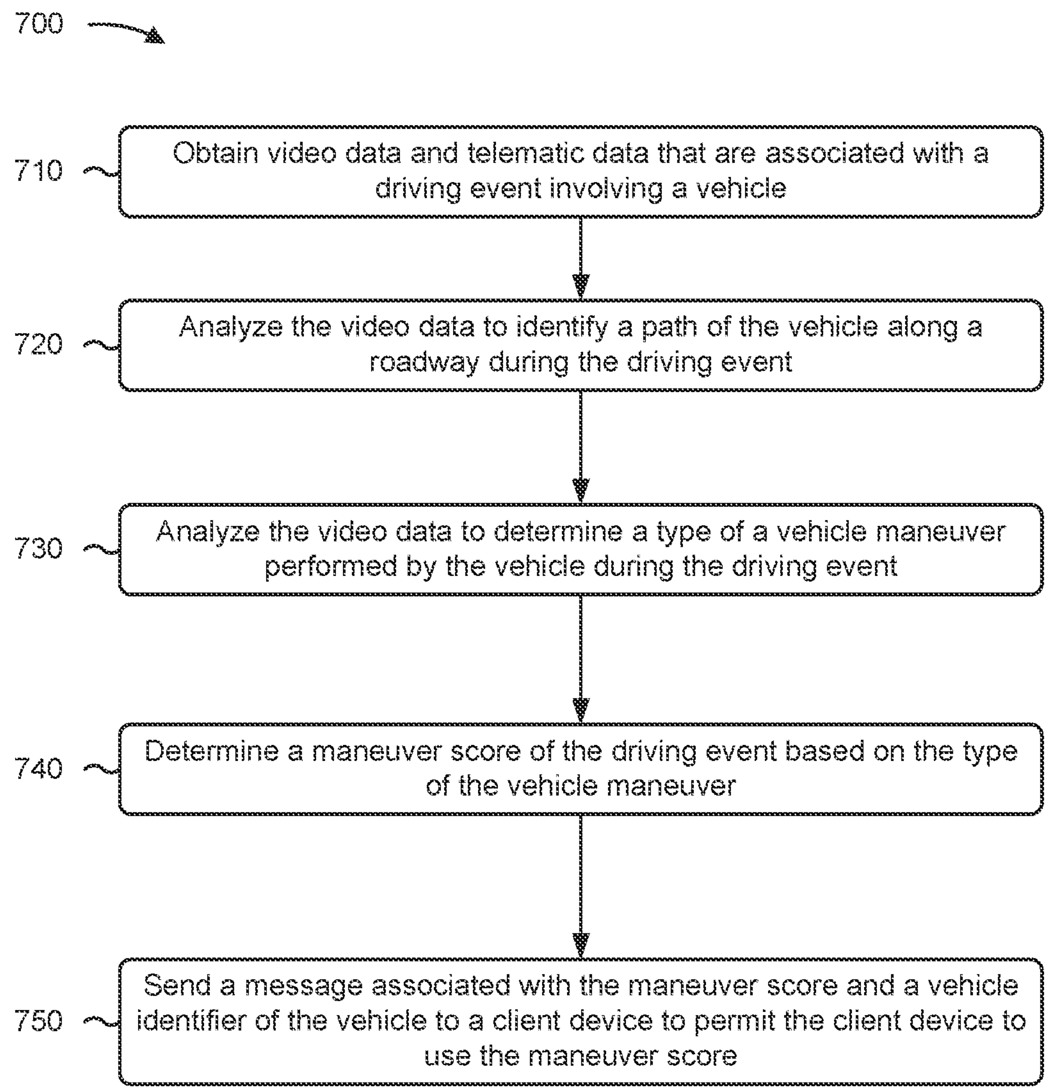
FIG. 7 is a flow chart of an example process relating to detecting and classifying an unsafe maneuver of a vehicle.

FIG. 7 is a flow chart of an example process 700 associated with systems and methods for detecting and classifying an unsafe maneuver of a vehicle. In some implementations, one or more process blocks of FIG. 7 may be performed by a maneuver classification platform (e.g., maneuver classification platform 501). In some implementations, one or more process blocks of FIG. 7 may be performed by another device or a group of devices separate from or including maneuver classification platform 206, such as a vehicle monitoring system (e.g., vehicle monitoring system 520), a client device (e.g., client device 530), a video storage device (e.g., video storage device 540), and/or the like. Additionally, or alternatively, one or more process blocks of FIG. 7 may be performed by one or more components of a device 600, such as processor 620, memory 630, storage component 640, input component 650, output component 660, communication interface 670, and/or the like.

As shown in FIG. 7, process 700 may include obtaining video data and telematic data that are associated with a driving event involving a vehicle (block 710). For example, maneuver classification platform 501 may obtain, via a vehicle monitoring system, video data and telematic data that are associated with a driving event involving a vehicle, as described above. Additionally, or alternatively, maneuver classification platform 501 may obtain other data associated with indicating a harsh driving event, such as dash cam sensor data, user device sensor data, vehicle sensor data, user input to a user interface, and/or the like.

In a first implementation, the telematic data indicates a harsh driving event that triggered the vehicle monitoring system to provide the video data and the telematic data, where the vehicle maneuver is associated with the harsh driving event. In a second implementation, alone or in combination with the first implementation, the telematic data indicates that the vehicle maneuver triggered the harsh driving event. In a third implementation, alone or in combination with one or more of the first through second implementations, the video data and the telematic data were obtained, from a storage device, via a link associated with the storage device, and the indication is provided in association with the link to permit client device 208 to access the video data and the telematic data. In a fourth implementation, alone or in combination with one or more of the first through third implementations, the video data and the telematic data are obtained from a storage device based on receiving, from a vehicle monitoring system of the vehicle, a link to the storage device, and provide, to a client device, the maneuver score, the vehicle identifier, and the link to permit client device 208 to access the video data and the telematic data.

As further shown in FIG. 7, process 700 may include analyzing the video data to identify a path of the vehicle along a roadway during the driving event (block 720). For example, maneuver classification platform 501 may analyze, using a path analysis model, the video data to identify a path of the vehicle along a roadway during the driving event, as described above. In some implementations, the path analysis model has been trained to identify the path of the vehicle based on historical information associated with markings of a plurality of roadways.

As further shown in FIG. 7, process 700 may include analyzing the video data to determine a type of a vehicle maneuver performed by the vehicle during the driving event (block 730). For example, maneuver classification platform 501 may analyze, using an object detection model, the video data to determine a type of a vehicle maneuver performed by the vehicle during the driving event, as described above.

As further shown in FIG. 7, process 700 may include determining a maneuver score of the driving event based on the type of the vehicle maneuver, the path of the vehicle, and the telematic data (block 740). For example, maneuver classification platform 501 may determine, using a vehicle maneuver classification model, a maneuver score of the driving event based on the type of the vehicle maneuver, the path of the vehicle, and the telematic data, as described above. In some implementations, the vehicle maneuver classification model has been trained based on historical video data that depicts previous driving events. In some implementations, the maneuver score is representative of a level of safety associated with the vehicle maneuver.

In a fifth implementation, alone or in combination with one or more of the first and fourth implementations, determining the maneuver score includes determining, from the type of the vehicle maneuver, that an obstruction is depicted in the video data, and determining the maneuver score based on at least one of: a type of the obstruction depicted in the video, a probability that the vehicle maneuver was performed to avoid the obstruction, or a probability that a different vehicle maneuver would have avoided the obstruction.

In a sixth implementation, alone or in combination with one or more of the first through fifth implementations, determining the maneuver score includes determining, from the type of the vehicle maneuver, that an obstruction is depicted in the video data; determining, based on movement of the obstruction relative to the roadway, that the vehicle maneuver was performed to avoid the obstruction; determining, based on the movement of the obstruction and the telematic data, a probability that a different vehicle maneuver would have avoided the obstruction, and determining the maneuver score based on the probability. In a seventh implementation, alone or in combination with one or more of the first through sixth implementations, determining the maneuver score includes determining, from the obstruction information, that an obstruction is depicted in the video data, and determining the maneuver score based on a timestamp of the vehicle maneuver according to the telematic data and a timestamp of the obstruction being depicted nearest the vehicle in the video data. In an eighth implementation, alone or in combination with one or more of the first through seventh implementations, process 700 includes determining that an obstruction is depicted in the video data; determining, based on movement of the obstruction relative to the roadway, that the vehicle maneuver was performed to avoid the obstruction; determining, based on the movement and the telematic data, a probability that a different vehicle maneuver would have avoided the obstruction; and determining the maneuver score based on the probability.

In a ninth implementation, alone or in combination with one or more of the first through eighth implementations, process 700 includes determining that an obstruction is not depicted in the video data; and generating the maneuver score to represent that the vehicle maneuver did not satisfy a safety threshold. In a tenth implementation, alone or in combination with one or more of the first through ninth implementations, determining the maneuver score includes determining, from the type of the vehicle maneuver, that an obstruction is not depicted in the video data, and generating the maneuver score to represent that the vehicle maneuver did not satisfy a threshold level of safety. In an eleventh implementation, alone or in combination with one or more of the first through tenth implementations, the maneuver score is representative of a level of safety associated with the vehicle maneuver.

As further shown in FIG. 7, process 700 may include sending a message associated with the maneuver score and a vehicle identifier of the vehicle to a client device to permit the client device to use the maneuver score (block 750). For example, maneuver classification platform 501 may send a message associated with the maneuver score and a vehicle identifier of the vehicle to a client device to permit the client device to use the maneuver score, as described above.

In a twelfth implementation, alone or in combination with one or more of the first through eleventh implementations, the client device is one of a plurality of client devices, and process 700 further includes, prior to sending the message, identifying the vehicle identifier based on an identifier associated with the video data or the telematic data, and selecting, based on the vehicle identifier being mapped to the client device, the client device from the plurality of client devices, where the message is sent to the client device based on selecting the client device. In a thirteenth implementation, alone or in combination with one or more of the first through twelfth implementations, the vehicle is one of a plurality of vehicles of a fleet and the client device is associated with managing the fleet, and the data structure includes a plurality of maneuver scores that are associated with the plurality of vehicles. In a fourteenth implementation, alone or in combination with one or more of the first through thirteenth implementations, process 700 includes identifying the vehicle identifier based on an identifier that is associated with the video data or the telematic data; storing, in a data structure, the maneuver score in association with the vehicle identifier; and sending, to a client device, a message to indicate that the maneuver score is stored in the data structure in association with the vehicle identifier.

In a fifteenth implementation, alone or in combination with one or more of the first through fourteenth implementations, process 700 includes identifying the vehicle identifier based on an identifier that is associated with the video data or the telematic data; and selecting, based on the vehicle identifier being mapped to a client device, the client device from a plurality of client devices, wherein the message is sent to the client device based on selecting the client device. In a sixteenth implementation, alone or in combination with one or more of the first through fifteenth implementations, process 700 includes sending, to a client device, a request for an authentication of the maneuver score; receiving, from the client device, a response associated with the authentication; and retraining the vehicle maneuver classification model based on the response. In a seventeenth implementation, alone or in combination with one or more of the first through sixteenth implementations, process 700 includes sending, to the client device, a request for an authentication of the maneuver score; receiving, from the client device, a response associated with the authentication; and retraining the vehicle maneuver classification model based on the response.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

analyzing, by a device, video data to determine a type of a vehicle maneuver performed by a vehicle during a driving event;

determining, by the device and from the type of the vehicle maneuver, that the vehicle maneuver was performed to avoid an obstruction;

determining, by the device and based on the obstruction relative to a roadway, a probability that a different vehicle maneuver would have avoided the obstruction;

determining, by the device, a maneuver score based on determining that the vehicle maneuver was performed to avoid the obstruction and the probability that the different vehicle maneuver would have avoided the obstruction; and sending, by the device, a message associated with the maneuver score.

2. The method of claim 1, further comprising:

comparing the maneuver score with other maneuver scores in a fleet management data structure; and identifying a pattern of unsafe maneuvers by a particular operator or by a particular vehicle based on the comparison; and wherein sending the message comprises:

sending the message associated with the maneuver score and the pattern of unsafe maneuvers.

3. The method of claim 1, further comprising:

determining, from the type of the vehicle maneuver, that the obstruction is depicted in the video data.

4. The method of claim 1, wherein determining the probability that the different vehicle maneuver would have avoided the obstruction comprises:

determining the probability that the different vehicle maneuver would have avoided the obstruction based on telematic data associated with the driving event, wherein the telematic data indicates that the vehicle maneuver triggered the driving event.

5. The method of claim 1, further comprising:

sending, to a client device, a request for an authentication of the maneuver score;

receiving, from the client device, a response associated with the authentication; and retraining a vehicle maneuver classification model associated with determining maneuver scores based on the response.

6. The method of claim 1, further comprising:

determining, from the type of the vehicle maneuver, that another obstruction is not depicted in the video data; and generating another maneuver score to represent that the vehicle maneuver did not satisfy a threshold level of safety.

7. The method of claim 1, wherein sending the message associated with the maneuver score comprises:

identifying a vehicle identifier based on an identifier associated with the video data;

selecting another device based on the vehicle identifier being mapped to the other device; and sending the message associated with the maneuver score to the other device.

8. A device, comprising:

one or more processors configured to:

analyze video data to determine a type of a vehicle maneuver performed by a vehicle during a driving event;

determine, from the type of the vehicle maneuver, that an obstruction is depicted in the video data;

determine, based on the obstruction relative to a roadway, a probability that the vehicle maneuver was performed to avoid the obstruction;

determine, based on the obstruction relative to the roadway, a probability that a different vehicle maneuver would have avoided the obstruction;

determine a maneuver score based on the probability that the vehicle maneuver was performed to avoid the obstruction and that the different vehicle maneuver would have avoided the obstruction; and perform an action associated with the maneuver score.

9. The device of claim 8, wherein the one or more processors, when determining the maneuver score, are configured to:

determine that an obstruction is depicted in the video data; and determine the maneuver score based on a timestamp of the obstruction being depicted nearest the vehicle in the video data.

10. The device of claim 8, wherein the one or more processors are further configured to:

determine, from the type of the vehicle maneuver, that a second obstruction is not depicted in the video data; and generate another maneuver score to represent that the vehicle maneuver did not satisfy a threshold level of safety.

11. The device of claim 8, wherein the one or more processors are further configured to:

compare the maneuver score with other maneuver scores in a fleet management data structure; and identify a pattern of unsafe maneuvers by a particular operator or by a particular vehicle based on the comparison; and wherein the one or more processors, when performing the action associated with the maneuver score, are configured to:

send a message associated with the maneuver score and the pattern of unsafe maneuvers.

12. The device of claim 8, wherein the one or more processors, when determining the probability that the different vehicle maneuver would have avoided the obstruction, are configured to:

determine the probability that the different vehicle maneuver would have avoided the obstruction based on the obstruction and telematic data that are associated with the driving event, wherein the telematic data indicates that the vehicle maneuver triggered the driving event.

13. The device of claim 8, wherein the one or more processors are further configured to:

send, to a client device, a request for an authentication of the maneuver score;

receive, from the client device, a response associated with the authentication; and retrain a vehicle maneuver classification model associated with determining maneuver scores based on the response.

14. The device of claim 8, wherein the video data was obtained, from a storage device, via a link associated with the storage device, and wherein the one or more processors are further configured to:

provide, to a client device, an indication that the maneuver score is stored in the storage device, wherein the indication is provided in association with the link to permit the client device to access the video data.

15. A non-transitory computer-readable medium storing instructions, the instructions comprising:

one or more instructions that, when executed by one or more processors, cause the one or more processors to:

analyze video data to determine a type of a vehicle maneuver performed by a vehicle during a driving event;

determine, from the type of the vehicle maneuver, that an obstruction is depicted in the video data;

determine, based on the obstruction, a probability that a different vehicle maneuver would have avoided the obstruction;

determine a maneuver score based on the probability; and send a message associated with the maneuver score.

16. The non-transitory computer-readable medium of claim 15, wherein the maneuver score is representative of a level of safety associated with the vehicle maneuver.

17. The non-transitory computer-readable medium of claim 15, wherein the one or more instructions that further cause the one or more processors to:

compare the maneuver score with other maneuver scores in a fleet management data structure;

identify a pattern of unsafe maneuvers by a particular operator or by a particular vehicle based on the comparison; and wherein the one or more instructions, that cause the one or more processors to send the message, cause the one or more processors to:

send the message associated with the maneuver score and the pattern of unsafe maneuvers.

18. The non-transitory computer-readable medium of claim 15, wherein the one or more instructions further cause the one or more processors to:

determine, from the type of the vehicle maneuver, that a second obstruction is not depicted in the video data; and generate another maneuver score to represent that the vehicle maneuver did not satisfy a threshold level of safety.

19. The non-transitory computer-readable medium of claim 15, wherein the one or more instructions further cause the one or more processors to:

send, to a client device, a request for an authentication of the maneuver score;

receive, from the client device, a response associated with the authentication; and retrain a vehicle maneuver classification model associated with determining maneuver scores based on the response.

20. The non-transitory computer-readable medium of claim 15, wherein the video data is obtained from a storage device based on receiving, from a vehicle monitoring system of the vehicle, a link to the storage device, and wherein the one or more instructions further cause the one or more processors to:

provide, to a client device, the maneuver score and the link to permit the client device to access the video data.

* * * * *